United States Patent
Moon et al.

(10) Patent No.: US 8,755,004 B2
(45) Date of Patent: Jun. 17, 2014

(54) LIQUID CRYSTAL DISPLAY DEVICE COMPRISING A SECOND DIFFUSION SHEET HAVING UPPER AND LOWER DIFFUSION LAYERS WHEREIN THE UPPER DIFFUSION LAYER INCLUDES MULTI-DISPERSED BEADS

(75) Inventors: Chang Yul Moon, Suwon-si (KR); Young Hun Jeong, Paju-si (KR); Sun Woong Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 267 days.

(21) Appl. No.: 12/850,621

(22) Filed: Aug. 4, 2010

(65) Prior Publication Data
US 2011/0032453 A1   Feb. 10, 2011

(30) Foreign Application Priority Data

Aug. 5, 2009 (KR) .................. 10-2009-0072061

(51) Int. Cl.
*G02F 1/1335* (2006.01)

(52) U.S. Cl.
USPC .......................................... 349/64; 349/112

(58) Field of Classification Search
CPC ............. G02F 1/133606; G02F 2001/133607; G02F 1/133611; G02F 1/133504; G02F 1/29; G02F 2203/28; G02F 1/134309; G02B 5/0278; G02B 5/0242; G02B 3/14

USPC .......................................... 349/64, 112, 200
See application file for complete search history.

(56) References Cited

U.S. PATENT DOCUMENTS

| | | | |
|---|---|---|---|
| 2001/0022997 A1* | 9/2001 | Honda et al. .................. 428/1.31 |
| 2004/0061944 A1* | 4/2004 | Kashima et al. .............. 359/599 |
| 2005/0151890 A1* | 7/2005 | Nishimura ....................... 349/20 |
| 2008/0151166 A1* | 6/2008 | Takemoto ...................... 349/118 |
| 2008/0259248 A1* | 10/2008 | Shimazaki et al. ............. 349/65 |
| 2008/0284949 A1* | 11/2008 | Matsumori et al. ............. 349/96 |

FOREIGN PATENT DOCUMENTS

| | | |
|---|---|---|
| JP | 2008-287228 A | 11/2008 |
| KR | 10-2007-0041348 A | 4/2007 |
| TW | 200624956 | 7/2006 |
| WO | WO 2008100057 A1 | 8/2008 |

* cited by examiner

*Primary Examiner* — Paul Lee
(74) *Attorney, Agent, or Firm* — Birch, Stewart, Kolasch & Birch, LLP

(57) ABSTRACT

A diffusion sheet adapted to minimize brightness difference between lights progressing in its oblique directions is discussed. The diffusion sheet according to an embodiment includes: a base film; a first diffusion material layer formed on an upper surface of the base film and configured to have a haze range of about 10~40%; and a second diffusion material layer formed on a lower surface of the base film.

6 Claims, 6 Drawing Sheets

LIQUID CRYSTAL DISPLAY DEVICE COMPRISING A SECOND DIFFUSION SHEET HAVING UPPER AND LOWER DIFFUSION LAYERS WHEREIN THE UPPER DIFFUSION LAYER INCLUDES MULTI-DISPERSED BEADS

CROSS-REFERENCE TO RELATED APPLICATION

This application claims priority under 35 U.S.C. 119 to Korean Patent Application No. 10-2009-0072061, filed on Aug. 5, 2009 in Republic of Korea, which is hereby incorporated by reference in its entirety.

BACKGROUND

1. Field of the Disclosure

This disclosure relates to a diffusion sheet formed to scatter light. Also, this disclosure relates to an liquid crystal display (LCD) device adapted to improve brightness characteristics in accordance with viewing angles and to reduce manufacturing costs.

2. Description of the Related Art

Cathode ray tubes (CRTs), which are one of widely used display devices, are mainly used as monitors for TVs, measuring apparatuses, or information terminals. However, the heavy weight and large size of the CRTs have been a major hindrance to the manufacturing of small, light electronic products.

To address this matter, LCD devices are gradually being used in a wide range of applications due to their advantages such as luminance, thinness, and low power consumption. Accordingly, LCD devices are being manufactured to have even larger screens, be thinner, and consume less power, in order to meet requirements of users. Such LCD devices display images by controlling the amount of light transmitted through liquid crystal.

LCD devices are not self-illuminating display devices, unlike CRTs. As such, an LCD device includes a backlight unit provided on the rear surface of an LCD panel. The backlight unit includes a separated light source providing light necessary to display an image.

The backlight unit can be classified as either an edge type or a direct type in accordance with the disposition of a light source. The edge type backlight unit includes a light source disposed at a side surface of it and a light guide plate configured to convert light from the light source into two-dimensional light which will be applied to the LCD panel. On the other hand, the direct type backlight unit includes a plurality of light sources arranged directly under the LCD panel and configured to apply light to the LCD panel.

The backlight unit further includes optical sheets configured to improve optical characteristics of light emitted from the light source. The optical sheets include a diffusion sheet configured to scatter light, a prism sheet configured to converge the scattered light in a front direction, a protective sheet configured to protect patterns on the prism sheet, and so on.

The above LCD devices must meet visibility requirements such as brightness characteristics of the display screen or TCO'03 requirements. The TCO'03 requirements were specified by "the Swedish confederation of professional employees" in 2003. The TCO'03 requirements enforce a luminance ratio between both side edges of an LCD panel to be below about 1.7 when the luminances of both side edges of the LCD panel are measured at a specified viewing angle.

In order to meet the TCO'03 luminance requirement, LCD devices of the related art are configured to use a combination of at least two sheets among optical sheets including a diffusion sheet, a prism sheet, a reflective polarizer sheet, and a multi-functional light converging sheet. Particularly, the related art LCD devices mainly use the reflective polarizer sheet among the optical sheets.

However, the reflective polarizer sheet corresponds to an optical sheet with a high price. As such, the related art LCD device increases manufacturing costs. Also, it is difficult for the related art LCD device to meet the TCO'03 requirement (more specifically, the TCO'03 luminance requirement) without using the reflective polarizer sheet.

Moreover, LCD devices are recently being manufactured to have a wide type display screen such as a display screen with an aspect ratio of 16:9. In other words, the display screen of the recent LCD device is being expanded horizontally. Due to this, it is more difficult for the LCD device to meet the TCO'03 requirements.

BRIEF SUMMARY

Accordingly, the present embodiments are directed to a diffusion sheet that substantially obviates one or more of problems due to the limitations and disadvantages of the related art, and to an LCD device with the same.

An object of the present embodiments is to provide a diffusion sheet that is adapted to minimize brightness difference between lights progressing in its oblique directions, and a method of manufacturing the same.

Another object of the present embodiments is to provide an LCD device that is adapted to improve luminance characteristics in accordance with viewing angles and to reduce manufacturing costs.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a diffusion sheet includes: a base film; a first diffusion material layer formed on an upper surface of the base film and configured to have a haze range of about 10~40%; and a second diffusion material layer formed on a lower surface of the base film.

A manufacturing method of a diffusion sheet according to another general aspect of the present embodiment includes: preparing a base film; forming a first diffusion material layer of a haze range of about 10~40% on an upper surface of the base film; and forming a second diffusion material layer formed on a lower surface of the base film.

An LCD device according to still another general aspect of the present embodiment includes: a liquid crystal display panel; a light source configured to emit light toward the liquid crystal display panel; a first diffusion sheet configured to scatter the light from the light source; a converging sheet disposed on the first diffusion sheet and configured to converge the scattered light; and a second diffusion sheet disposed on the converging sheet and configured to have a haze range of about 10%~40% and to improve visibility of the liquid crystal display panel in accordance with a viewing angle.

Other systems, methods, features and advantages will be, or will become, apparent to one with skill in the art upon examination of the following figures and detailed description.

It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
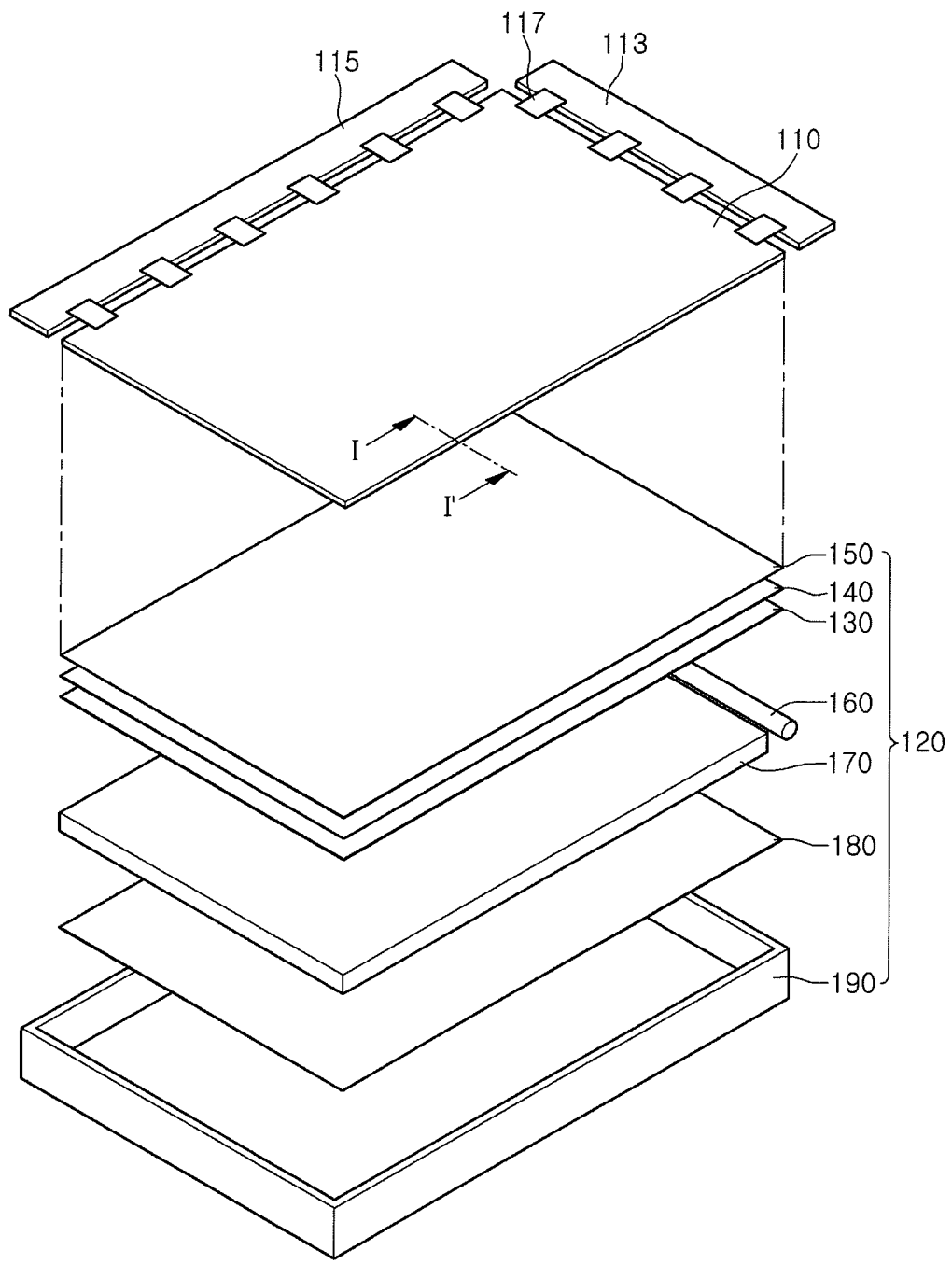
FIG. 1 is a disassembled perspective view showing an LCD device according to an embodiment of the present disclosure.

Reference will now be made in detail to the embodiments of the present invention, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
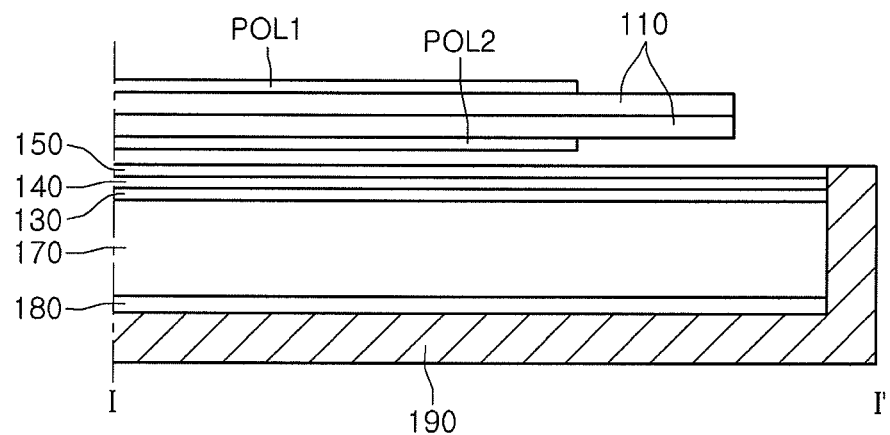
FIG. 2 is a cross-sectional view showing the LCD device taken along a line I-I' in FIG. 1.
Figure 3:
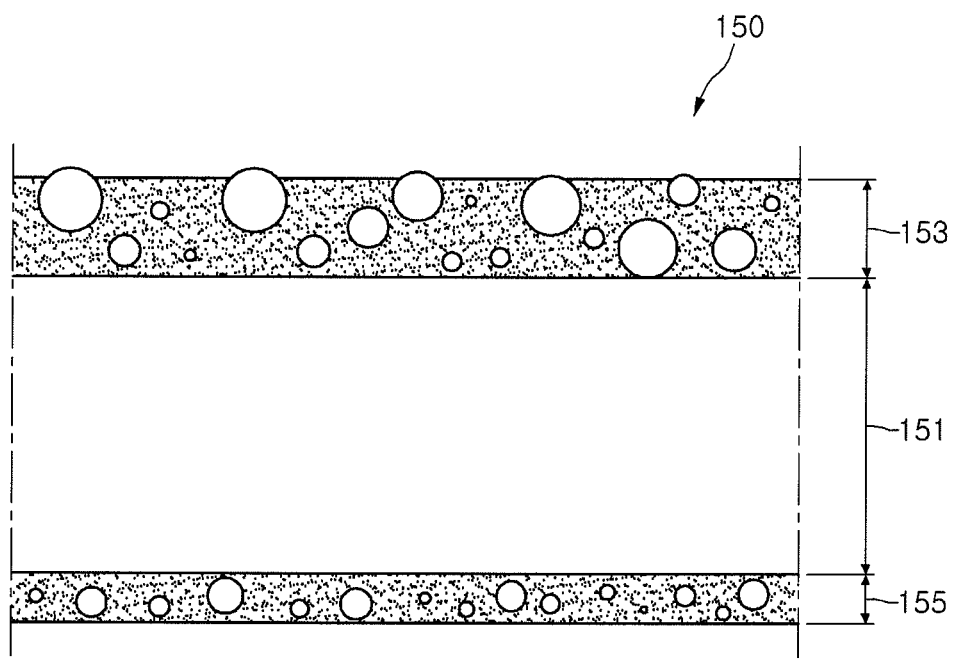
FIG. 3 is a cross-sectional view showing a second diffusion sheet in FIG. 2.

FIG. 1 is a disassembled perspective view showing an LCD device according to an embodiment of the present disclosure. FIG. 2 is a cross-sectional view showing the LCD device taken along a line I-I' in FIG. 1. FIG. 3 is a cross-sectional view showing a second diffusion sheet in FIG. 2.

Referring to FIGS. 1 to 3, an LCD device according to an embodiment of the present disclosure includes an LCD panel 110 configured to display images, and a backlight unit 120 disposed under the LCD panel 110 and configured to apply light to the LCD panel 110. The LCD device further includes a top case (not shown) engaged with the backlight unit 120. The top case is configured to encompass the upper surface edges of the LCD panel 110, even though it is not shown in the drawings.

Although it is not shown in detail in the drawings, the LCD panel 110 includes a thin film transistor substrate and a color filter substrate disposed opposite each other and combined to uniformly maintain a cell gap between them, as well as a liquid crystal layer interposed between the two substrates. The thin film transistor substrate includes a plurality of gate lines formed on it, a plurality of data lines formed to cross the plurality of gate lines, and a plurality of thin film transistors formed at the intersections of the plurality of gate lines and the plurality of data lines.

The LCD device still further includes upper and lower polarizer plates POL1 and POL2. The upper polarizer plate POL1 is attached on the upper surface of the LCD panel 110. The lower polarizer plate POL2 is attached on the lower surface of the LCD panel 110.

Furthermore, the LCD device includes a gate driving printed-circuit-board (PCB) 113 and a data driving PCB 115 disposed by the sides of the LCD panel 110. The gate driving PCB 113 sequentially applies a scan signal to the gate lines on the LCD panel 110. The data driving PCB 115 applies data signals to the data lines on the LCD panel 110. To this end, the gate and data driving PCBs 113 and 115 are electrically connected to the LCD panel 110 by means of COFs (chip on film) 117. The COFs 117 can be replaced with tape carrier packages (TCPs).

The backlight unit 120 includes a box-shaped bottom cover 190 with an opened upper surface, at least one light source 160 disposed on an inner side surface of the bottom cover 190, and a light guide plate 170 disposed parallel to the light source 160. The light guide plate 170 is configured to convert incident light from the light source 160 into two-dimensional light.

The backlight unit 120 further includes optical sheets disposed on the light guide plate 170, and a reflection sheet 180 disposed under the light guide plate 170. The optical sheets are used to scatter and converge light. The reflection sheet 180 reflects light progressing downward from the light guide plate 170 toward the LCD panel 110, in order to reduce light loss.

Although it is not shown in the drawings, the backlight unit 120 still further includes a support main (not shown) placed inside the bottom cover 190. The support main is configured to receive the light source 160, the light guide plate 170, and the optical sheets.

The light source 160 can include a lamp or a plurality of light emission diodes (LEDs) which are used as a spotted light source. The light source 160 can further include a light guider (or a light reflector) configured to encompass the lamp or the plurality of LEDs. The light guider reflects light emitted from the lamp or the plurality of LEDs toward the light guide plate 170.

The optical sheets include a first diffusion sheet 130 configured to scatter light, a converging sheet 140 configured to converge light, and a second diffusion sheet 150 disposed on the conversing sheet 140. The second diffusion sheet 150 scattering light from the converging sheet 140 allows brightness difference between lights progressing in its oblique directions to be minimized. As such, the second diffusion sheet 150 can be used to meet the TCO'03 requirement.

The TCO'03 requirement forces a ratio value, which is obtained by dividing a measured maximum luminance by a measured minimum luminance, to be equal to or less than 1.70, in order to ensure luminance uniformity-angular dependence. In other words, the TCO'03 requirement relates to a lateral viewing angle which is desired by most consumers from countries in the world. More specifically, when luminances in both edge of a display screen are measured at a desired viewing angle, a luminance ratio between the measured luminances must be the same as or less than a standard luminance ratio of 1.7 which is included in the TCO'03 requirement, so that the LCD device provides users with substantial visibility. The standard luminance ratio can be changed without being fixedly set to 1.7. Actually, the TCO'05 requirement prescribes the standard luminance ratio to be set to 1.73.

The second diffusion sheet 150 includes a base layer 151, an upper diffusion layer 153 formed on the upper surface of the base layer 151, and a lower diffusion layer 155 formed on the lower surface of the base layer 151.

The base layer 151 is formed to include a material with superior light-transparency, heat-resistibility, chemical resistibility, and mechanical strength. For example, the base layer 151 can be formed from one selected from a material group including polyethylene, polymethylmethacrylate, polyamide, polyimide, polypropylene, polyurethane, and so on.

The upper diffusion layer 153 includes a plurality of multi-dispersed-beads inside it. The multi-dispersed-beads are formed to have a diameter range of about 2 μm~15 μm. Also, the multi-dispersed-beads have a refractive index range of about 1.45~1.50.

The lower diffusion layer 155 includes a plurality of mono-dispersed-beads inside it. The mono-dispersed-beads are formed to have a diameter range of about 2 μm~15 μm. Also, the mono-dispersed-beads have a refractive index range of about 1.45~1.50.

Multi-dispersed-bead content contained in the upper diffusion layer 153 is adjusted so that the second diffusion sheet 150 with the base layer 151, upper diffusion layer 153, and lower diffusion layer 155 have a haze in a range of about 10%~40%. On the other hand, the ordinary diffusion sheet has a haze in a range of 50%~80%.

In order to manufacture such a second diffusion sheet 150, a first diffusion material layer including multi-dispersed beads is coated on an upper surface of a base film which is used as the base layer 151. The base film is formed to include a material with superior light-transparency, heat-resistibility, chemical resistibility, and mechanical strength. Actually, the base film can be formed from one selected from a material group including polyethylene, polymethylmethacrylate, polyamide, polyimide, polypropylene, polyurethane, and so on. The first diffusion material coated on the upper surface of the base film is used as an upper diffusion layer 153. The content of the multi-dispersed beads is controlled the first diffusion material layer to have a haze of about 10~40%. Also, the multi-dispersed beads included in the first diffusion material is formed to have a diameter of about 2~15 μm and a refractive index of about 1.45~1.50.

Subsequently, a second diffusion layer including mono-dispersed beads is formed on a lower surface of the base film. The second diffusion layer is used as a lower diffusion layer 155. The momo-dispersed beads is formed to have a diameter of about 2~5 μm and a refractive index of about 1.45~1.50.

Figure 4:
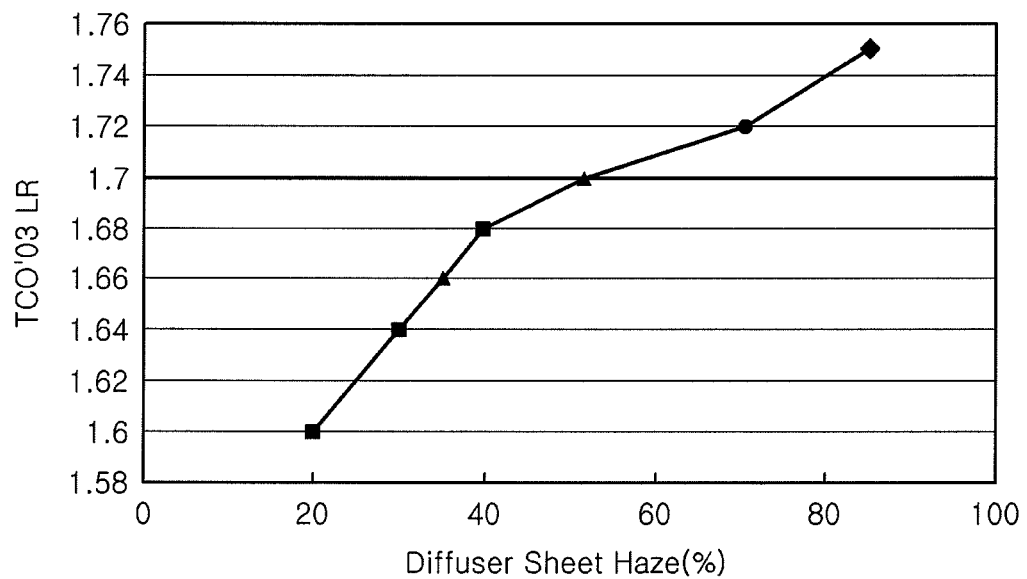
FIG. 4 is a graphic diagram illustrating the variation of TCO'03 luminance ratio between the left and right edges of a display screen opposite to the haze of the second diffusion sheet.

FIG. 4 is a graphic diagram illustrating the variation of TCO'03 luminance ratio between the left and right edges of a display screen opposite to the haze of the second diffusion sheet.

As seen from FIG. 4, the luminance ratio between the left and right edges of a display screen becomes above 1.70 when the second diffusion sheet 150 has a haze of above 50%. In this case, the display device can not meet the TCO'03 requirement.

In a different manner, the second diffusion sheet 150 maintains a haze within the range of about 10%~40% by adjusting the multi-dispersed-bead content of the upper diffusion layer 153. As such, the LCD device of the present embodiment can meet the TCO'03 requirement.

TABLE 1

| | Haze of $2^{nd}$ diffusion sheet | TCO luminance ratio between left and right sides of screen | Visibility |
|---|---|---|---|
| 1 | 20% | 1.60 | OK |
| 2 | 30% | 1.64 | OK |
| 3 | 35% | 1.66 | OK |
| 4 | 40% | 1.68 | OK |
| 5 | 50% | 1.70 | OK |
| 6 | 70% | 1.72 | HG |
| 7 | 85% | 1.75 | HG |

These facts can be evidently read from table 1. Table 1 represents luminance ratios between the left and right edges of a display screen and visibility in accordance with the haze of the second diffusion sheet 150. As seen from table 1, if the haze of the second diffusion sheet 150 exceeds 50%, the luminance ratio becomes higher than 1.70 and the visibility of the LCD device is poor. Therefore, the LCD device can not meet the TCO'03 requirement.

In this manner, the LCD device according to an embodiment of the present disclosure includes the second diffusion sheet with the haze of about 10%~40% which is disposed on the most upper portion of the optical sheets. As such, the LCD device can meet the TCO'03 requirement, and furthermore can provide improved visibility at a desired viewing angle.

Also, the LCD device of the present embodiment can be manufactured in a wide type because the second diffusion sheet allows the LCD device to meet the TCO'03 requirement. In addition, the second diffusion sheet makes the elimination of the reflective sheet of a high price from the LCD device. As such, the LCD device can reduce manufacturing costs.

Figure 5:
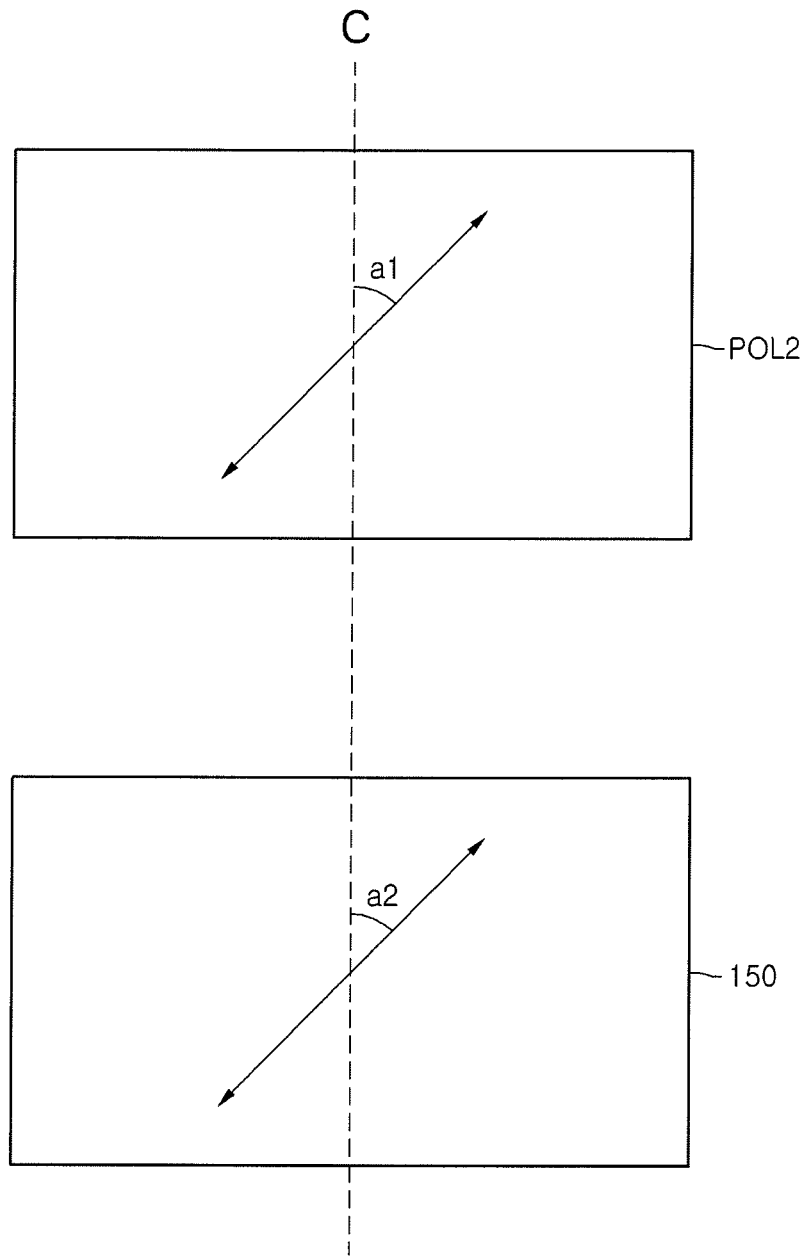
FIG. 5 is a view illustrating a polarizing axis of a lower polarization plate and an aligning axis of the second diffusion sheet.

FIG. 5 is a view illustrating a polarization axis of the lower polarizer plate and an alignment axis of the second diffusion sheet.

As shown in FIG. 5, the lower polarizer plate POL2 has a fixed polarization axis which is inclined at a polarization angle "a1" to a reference line "C" (for example, a center axis). The base layer 151 of the second diffusion sheet 150 has an alignment direction which is inclined at an alignment angle "a2" to the reference line "C". The alignment direction of the base layer (151 in FIG. 3) of the second diffusion sheet 150 can be defined as a direction parallel to the extrusion direction of a roller-extruder which is used in the formation of the second diffusion sheet 150.

TABLE 2

| Alignment angle of base layer of $2^{nd}$ diffusion sheet | Haze of $2^{nd}$ diffusion sheet | TCO'03 luminance ratio |
|---|---|---|
| 40° | 37% | 1.67 |
| 140° | 37% | 1.75 |

The haze of the second diffusion sheet 150 is set to about 37% and the polarization axis of the lower polarizer plate POL2 on the LCD panel 110 is fixed to incline at the polarization angle "a1" of 40° to the reference line "C", as described in table 2. In this case, if the alignment direction of the base layer (151 in FIG. 3) of the second diffusion sheet 150 is set to incline at an alignment angle "a2" of 40° to the reference line "C", the TCO'03 luminance ratio becomes about 1.67. Alternatively, when the alignment direction of the base layer (151 in FIG. 3) of the second diffusion sheet 150 is set to incline at an alignment angle "a2" of 130° to the reference line "C", the TCO'03 luminance ratio becomes about 1.75. In other words, if the alignment angle "a2" between the alignment direction of the base layer (151 in FIG. 3) of the second diffusion sheet 150 and the reference line "C" must correspond to the polarization angle "a1" between the polarization axis of the lower polarizer plate POL2 on the LCD panel 110 and the reference line "C", the LCD device can meet the TCO'03 requirement. On the contrary, when the alignment direction of the base layer (151 in FIG. 3) of the second diffusion sheet 150 is orthogonal to the polarization axis of the lower polarizer plate POL2 on the LCD panel 110, the TCO'03 requirement can be not satisfied.

In view of these points, as the alignment direction of the base layer (151 in FIG. 3) of the second diffusion sheet 150 is set to closely correspond to the polarization axis of the lower polarizer plate POL2 on the LCD panel 110, the TCO'03 requirement can be well satisfied. As such, the alignment angle "a2" of the second diffusion sheet 150 may be set within an error range of ±10° to the polarization angle "a1" of the lower polarizer plate POL2 on the LCD panel 110.

As described above, the LCD device according to an embodiment of the present disclosure forces the second diffusion sheet 150 to have a haze range of about 10%~40% by adjusting the multi-dispersed-bead content in the upper diffusion layer of the second diffusion sheet 150. Also, the LCD device allows the second diffusion sheet 150 to maintain an alignment angle "a2" within the error range of ±10° to the polarization angle "a1" of the lower polarizer plate POL2 on the LCD panel 110. Therefore, although the LCD device is manufactured in the wide type varying the angles of both edges of the display screen to a desired viewing angle at the measurement of the TCO requirement, visibility of the wide type LCD device can be improved.

Figure 6:
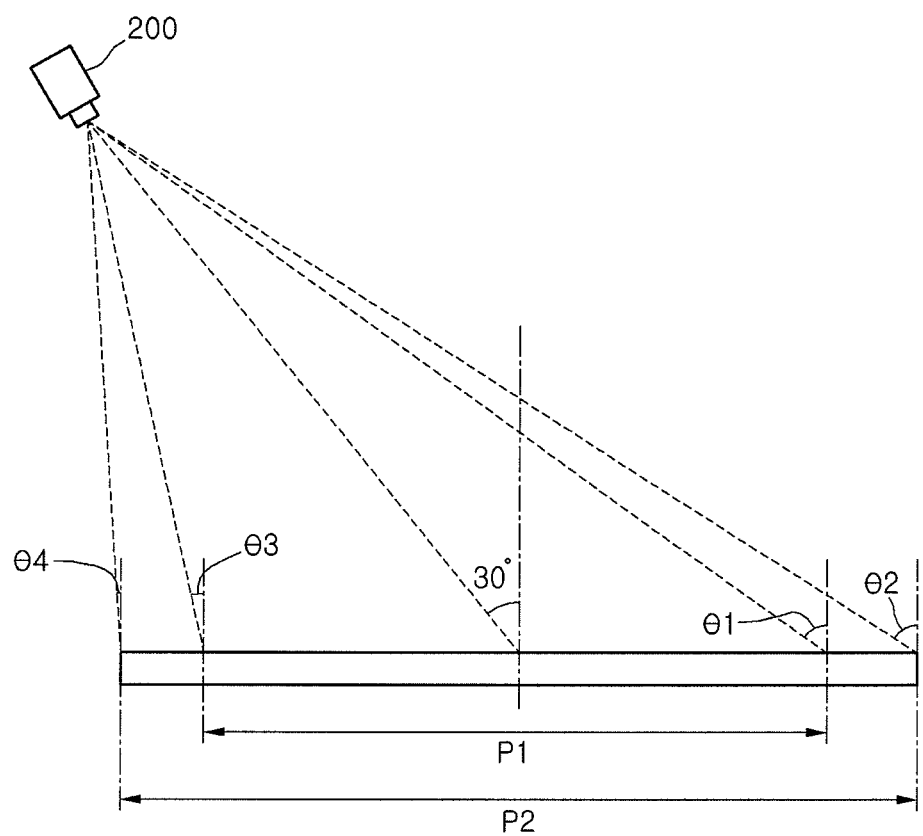
FIG. 6 is a view illustrating methods of measuring luminance values of the TCO requirement for an related art LCD device and a wide type LCD device.
Figure 7:
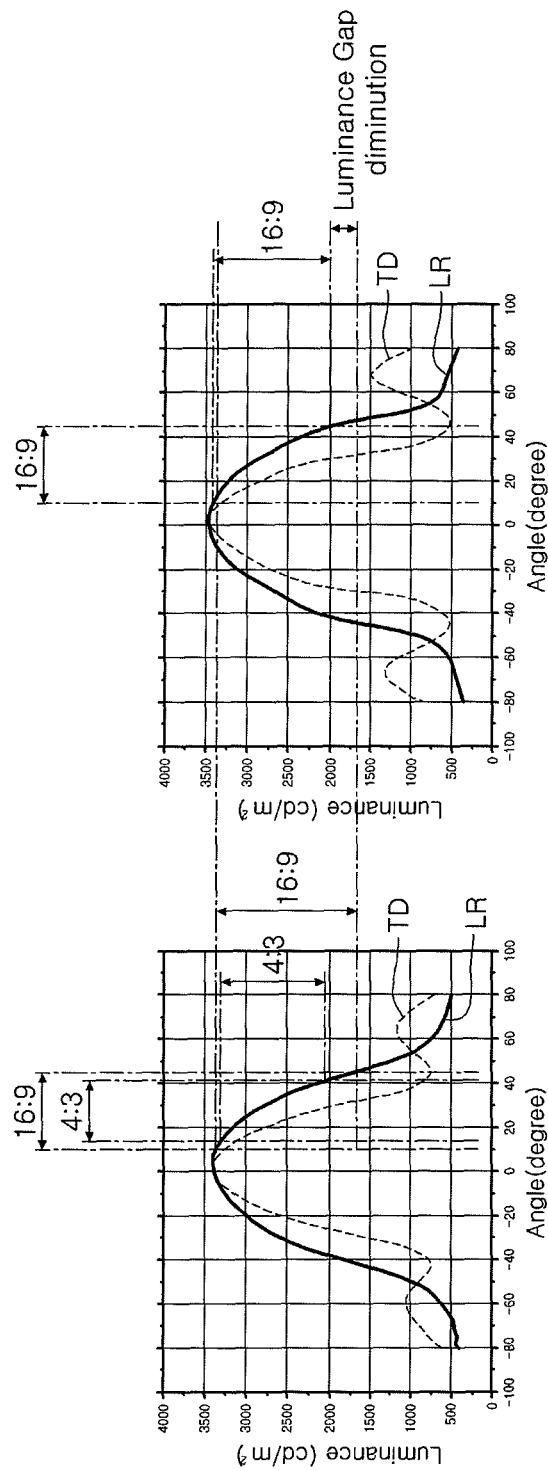
FIG. 7 is a data sheet including graphic diagrams which illustrate variations of the measured luminance values at the measurement of TCO requirement for an ordinary LCD device and another LCD device with the second diffusion sheet according to an embodiment of the present disclosure.

FIG. 6 is a view illustrating methods of measuring luminance values of the TCO requirement for the ordinary LCD device and a wide type LCD device. FIG. 7 is a data sheet including graphic diagrams which illustrate variations of the measured luminance values at the measurement of TCO requirement for an ordinary LCD device and another LCD device with the second diffusion sheet according to an embodiment of the present disclosure.

As shown in FIG. 6, the display screen of a wide type LCD device "P2" has wider left and right sides than those of the one of the ordinary LCD device "P1". As such, when luminance values for the left and right edges of the display screens are measured by measurement equipment positioned at an arbitrary point in a desired viewing angle (for example, a angle of 30° to the front direction of the display screen) direction, a left measurement angle θ4 of the wide type LCD device P2 become smaller than a left measurement angle θ3 of the ordinary LCD device P1, and a right measurement angle θ2 of the wide type LCD device P2 is larger than a right measurement angle θ1 of the ordinary LCD device P1. In other words, the difference between maximum and minimum luminance values to be used in calculating the TCO'03 luminance ratio increases. Therefore, the measured TCO'03 luminance ratio, which is obtained by dividing the maximum luminance value by the minimum luminance value, has an enlarged value of above 1.70.

The left graphic diagram in FIG. 7 represents variations of a top-bottom direction luminance TD and a left-right direction luminance LR on a wide type LCD device with ordinary optical sheets, in accordance with the viewing angle. The right graphic diagram in FIG. 7 represents variations of a top-bottom direction luminance and a left-right direction luminance on another wide type LCD device with the second diffusion sheet of the present embodiment, in accordance with the viewing angle.

As seen from FIG. 7, the wide type LCD device of the present embodiment can reduce the variations of the maximum and minimum luminance values which are caused by the variations of the left and right measurement angles at the measurement of the TCO requirement. Therefore, the wide type LCD device according to an embodiment of the present disclosure can meet the TCO'03 requirement. This results from the facts that the second diffusion sheet on the most upper portion of the optical sheets has a haze range of about 10%~40% by adjusting the multi-dispersed-bead content in its upper diffusion layer and maintains its alignment angle within the error range of ±10° to the polarization angle of the lower polarizer plate POL2 on the LCD panel in the center of the reference line.

In this way, the LCD device according to an embodiment of the present disclosure can meet the TCO'03 requirement without using the reflective polarizer sheet of a high price. Therefore, the LCD device can reduce manufacturing costs.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:
1. A liquid crystal display device comprising:
a liquid crystal display panel;
a light source configured to emit light toward the liquid crystal display panel;
a first diffusion sheet configured to scatter the light from the light source;
a converging sheet disposed on the first diffusion sheet and configured to converge the scattered light;
a second diffusion sheet disposed on the converging sheet and configured to have a haze range of about 10%~40% and to improve visibility of the liquid crystal display panel in accordance with a viewing angle; and
a lower polarizer plate on a lower surface of the liquid crystal display panel,
wherein an alignment axis of the second diffusion sheet is set within an error range of ±10° to a polarization axis of the lower polarizer plate,
wherein the alignment axis is defined as a direction parallel to an extrusion direction of a roller-extruder which is used in the formation of the second diffusion sheet,
wherein the second diffusion sheet includes:
a base layer,
an upper diffusion layer formed on an upper surface of the base layer, and
a lower diffusion layer formed on a lower surface of the base layer,
wherein the upper diffusion layer includes a plurality of multi-dispersed-beads,
wherein the lower diffusion layer includes a plurality of mono-dispersed-beads,
wherein the base layer is formed from polyamide or polyimide, and wherein the haze range of about 10%~40% is obtained based on a content of the plurality of multi-dispersed-beads in the upper diffusion layer.

2. The liquid crystal display device claimed as claim 1, wherein the multi-dispersed-bead is formed to have a diameter range of about 2 μm~15 μm.

3. The liquid crystal display device claimed as claim 1, wherein the multi-dispersed-bead is formed to have a refractive index range of about 1.45~1.50.

4. The liquid crystal display device claimed as claim 1, wherein the mono-dispersed-bead is formed to have a diameter range of about 2 μm~5 μm.

5. The liquid crystal display device claimed as claim 1, wherein the mono-dispersed-bead is formed to have a refractive index range of about 1.45~1.50.

6. The liquid crystal display device claimed as claim 1, wherein an alignment axis of the second diffusion sheet is equal to a polarization axis of the lower polarizer plate.

* * * * *